(12) United States Patent
Li

(10) Patent No.: US 8,517,678 B2
(45) Date of Patent: Aug. 27, 2013

(54) HEAT DISSIPATING ASSEMBLY

(75) Inventor: Zhan-Yang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 523 days.

(21) Appl. No.: 12/843,099

(22) Filed: Jul. 26, 2010

(65) Prior Publication Data
US 2011/0155344 A1 Jun. 30, 2011

(30) Foreign Application Priority Data
Dec. 30, 2009 (CN) .............................. 200920318939

(51) Int. Cl.
*F01D 25/28* (2006.01)
(52) U.S. Cl.
USPC ..................... 415/213.1; 415/220; 416/244 R
(58) Field of Classification Search
USPC ................. 416/244 R, 120, 204 R; 361/695; 415/60, 66, 213.1, 220, 198 R
See application file for complete search history.

(56) References Cited

U.S. PATENT DOCUMENTS

| 6,808,411 B2* | 10/2004 | Chen | 439/485 |
| 2008/0151495 A1* | 6/2008 | Yin et al. | 361/695 |
| 2008/0158813 A1* | 7/2008 | Yin | 361/695 |
| 2009/0059521 A1* | 3/2009 | Yin | 361/695 |

* cited by examiner

*Primary Examiner* — Edward Look
*Assistant Examiner* — William Grigos
(74) *Attorney, Agent, or Firm* — Altis Law Group, Inc.

(57) ABSTRACT

A heat dissipating assembly includes a heat dissipating member, a bracket and a locking member. A male connector is coupled to the heat dissipating member with a cable. The bracket includes two securing plates. Each securing plate defines a positioning hole. A locking member is secured to the heat dissipating member and includes a board body. Two locking portions are located on the board body and engaged in the positioning holes. The locking member defines a through opening. Two first locking blocks and two second locking blocks are located on the locking member. The cable is received in the through opening, and the male connector is inserted through the through opening and secured both between the first locking blocks and between the second locking blocks.

14 Claims, 4 Drawing Sheets

HEAT DISSIPATING ASSEMBLY

This application is related to co-pending application entitled, "MOUNTING APPARATUS AND COMPUTER SYSTEM FOR HEAT DISSIPATING MEMBER", filed on Jul. 22, 2010, application Ser. No. 12/841,421.

BACKGROUND

1. Technical Field

The present disclosure relates to a heat dissipating assembly with a fan.

2. Description of Related Art

In a computer system, a plurality of fans is used. Thus, a mounting apparatus is needed to conveniently mount the fans in the computer system.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
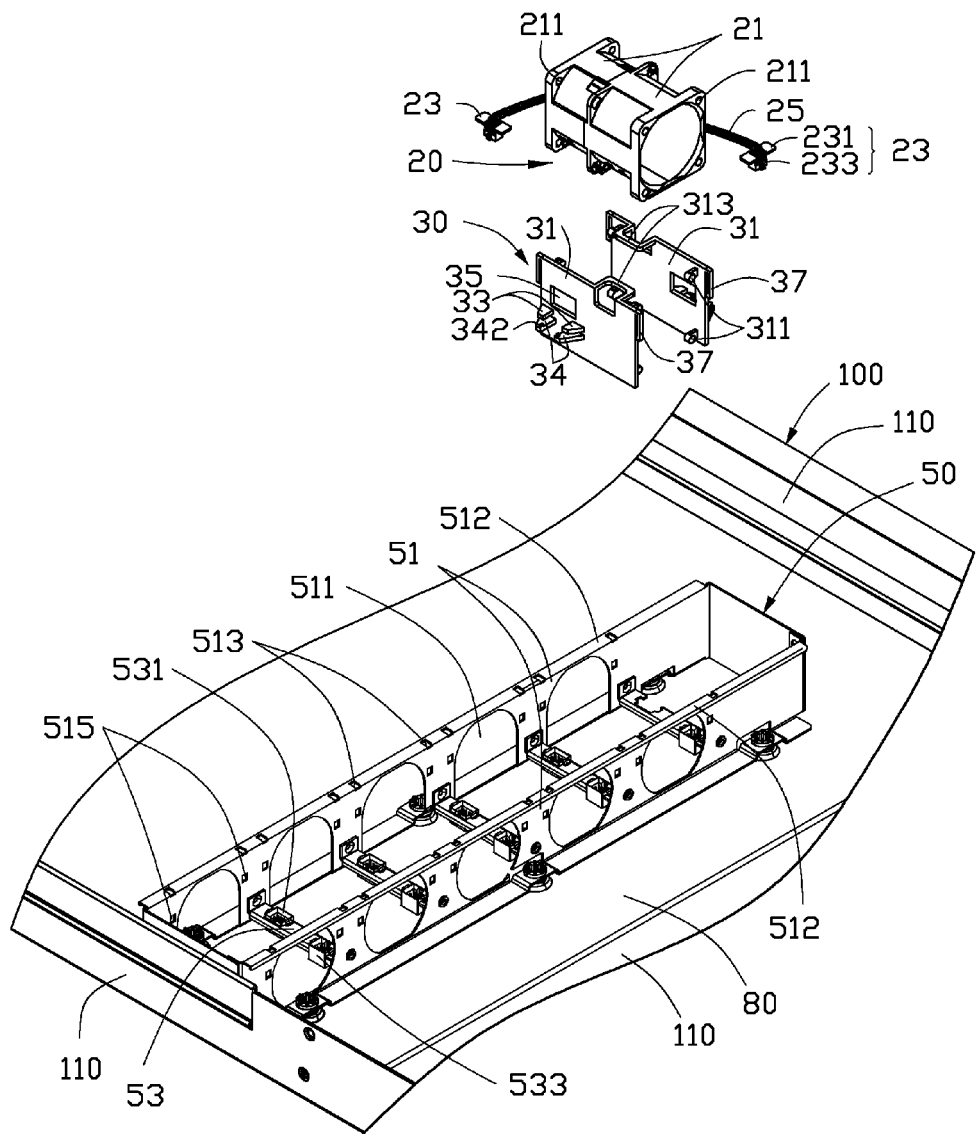
FIG. 1 is an exploded view of a mounting apparatus and a heat dissipating member in accordance with an embodiment.

Referring to FIG. 1, a mounting apparatus is configured for securing a heat dissipating member 20. The heat dissipating member 20 includes two fans 21 secured to each other, and each fan 21 defines a plurality of mounting holes 211. A male connector 23 is electrically connected to each fan 21 by cables 25. The male connector 23 includes a base board 231 and an inserting portion 233 connected to the base board 231.

The mounting apparatus in accordance with an embodiment includes a chassis 100, a bracket 50, and two locking members 30.

The chassis 100 includes a base plate 110 and two opposite side plates 120 located on the base plate 110. In one embodiment, the side plates 120 are substantially parallel to each other and substantially perpendicular to the base plate 110.

The bracket 50 is secured in the chassis 100 and includes two securing plates 51. In one embodiment, the securing plates 51 are substantially parallel to each other and substantially perpendicular to the base plate 110 and the side plates 120 of the chassis 100. A plurality of ventilation holes 511 is defined in each securing plate 51. The ventilation holes 511 of one securing plate 51 correspond to the ventilation holes 511 of another securing plate 51. A flange 512 is located on a top edge of each securing plate 51. In one embodiment, the flanges 512 are substantially perpendicular to the securing plates 51. Each flange 512 defines two through holes 513 at two sides of each ventilation hole 511. A plurality of position holes 515 is defined in each securing plate 51, corresponding to the through holes 513 of each flange 512. A plurality of mounting pieces 53 is secured to the securing plates 51. The mounting pieces 53 are located at one side of the ventilation holes 511 of each securing plate 51. A first female connector 531 and a second female connector 533 are located on each mounting piece 53.

Each locking member 30 includes a board body 31. A plurality of locking posts 311 is located on a first surface of the locking member 30 and configured to engage in the mounting holes 211 of the fans 21. Two first locking blocks 33 and two second locking blocks 34 are located on a second surface of the board body 31, which is opposite to the first surface. A through opening 35 is defined in the board body 31 above the locking blocks 33 and 34, for inserting the male connector 23 therethrough from the first surface to the second surface. A blocking tab 342 is located on each second locking block 34 adjacent the first locking block 33. An operating portion 313 is located on a top edge of the board body 31. Two resiliently flexible locking portions 37 located on opposite side edges of the board body 31, are configured for engaging in the through holes 513 of the bracket 50.

Figure 2:
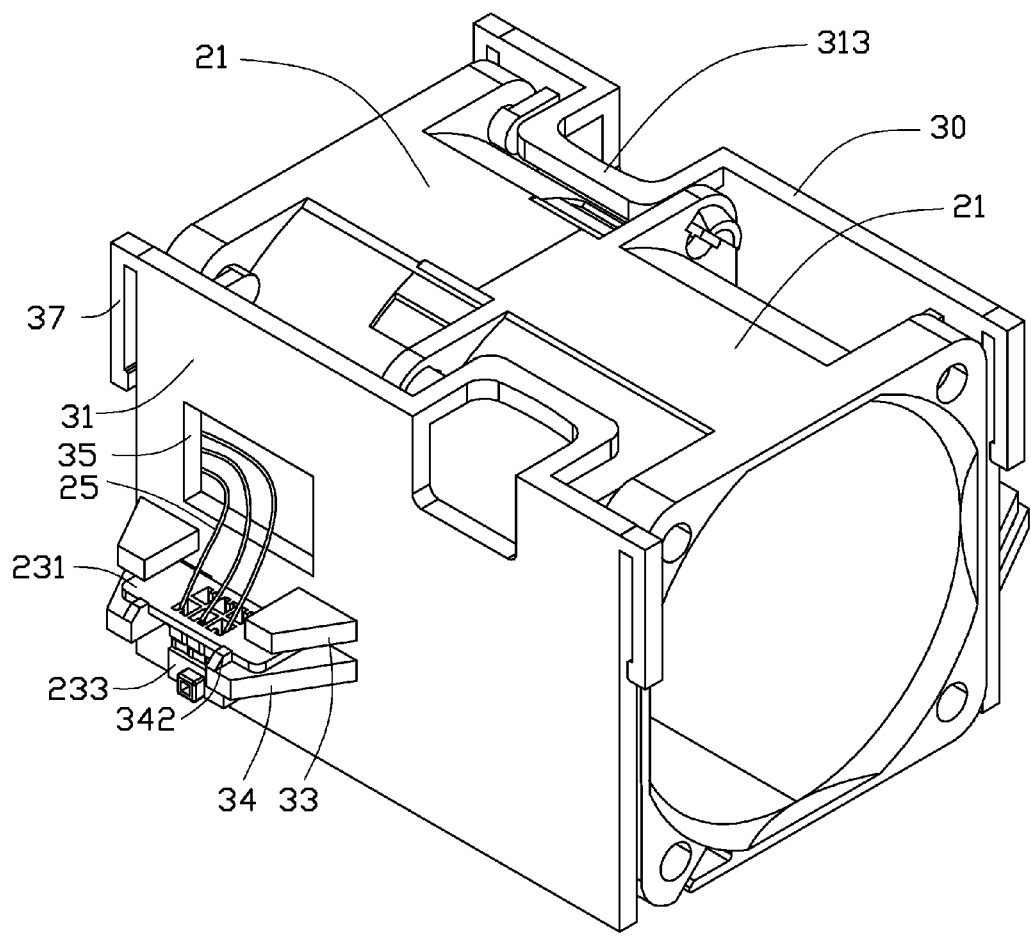
FIG. 2 is an assembled view of the heat dissipating member, the locking member, and a second locking member of FIG. 1.
Figure 3:
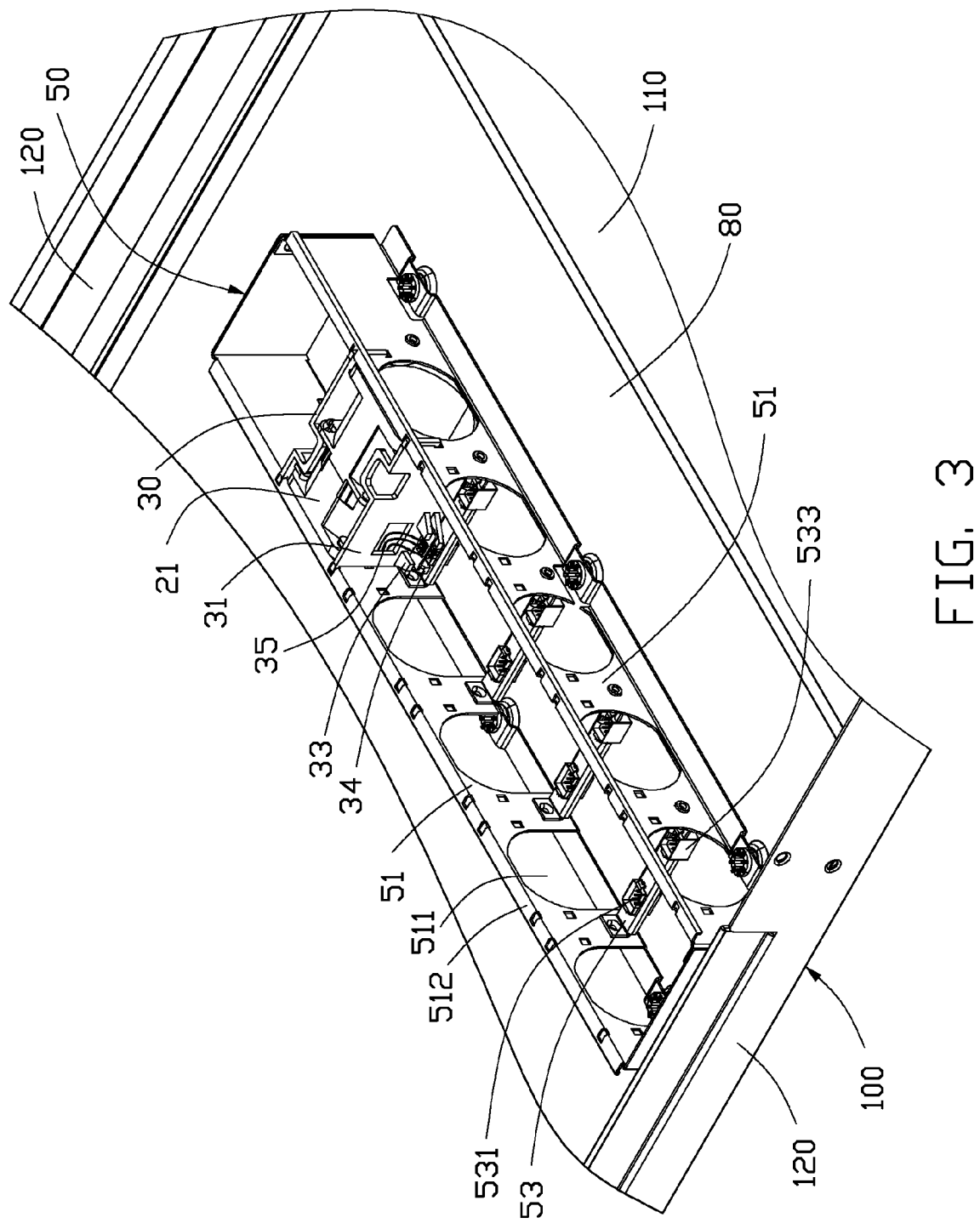
FIG. 3 is an assembled view of the mounting apparatus and the heat dissipating member of FIG. 1.

Referring to FIGS. 1-3, the male connectors 23 are inserted through the through openings 35 of the locking members 30. The locking members 30 are secured to the heat dissipating member 40 with the locking posts 311 engaged in the corresponding mounting holes 211. The base boards 231 of the male connectors 23 are positioned between the first locking blocks 33 and the second locking blocks 34. The inserting portions 233 of the male connectors 23 are positioned between the second locking blocks 34 of the locking members 30. The blocking tabs 342 block the male connectors 23 from disengaging from the first and second locking blocks 33 and 34.

The heat dissipating member 20 and the locking member 30 are inserted in between the securing plates 51 of the bracket 50. The heat dissipating member 20 corresponds to one ventilation hole 511 of each securing plate 51. The locking portions 37 of the locking members 30 are inserted in the through holes 513 of the flanges 512, positioned outside of the bracket 50, and engaged in the corresponding positioning holes 513. The securing plates 51 are positioned between the board body 31 and the locking portion 37. One male connector 23 is electrically engaged with the second female connector 533, and the other male connector 23 is electrically engaged with the first female connector 531.

Figure 4:
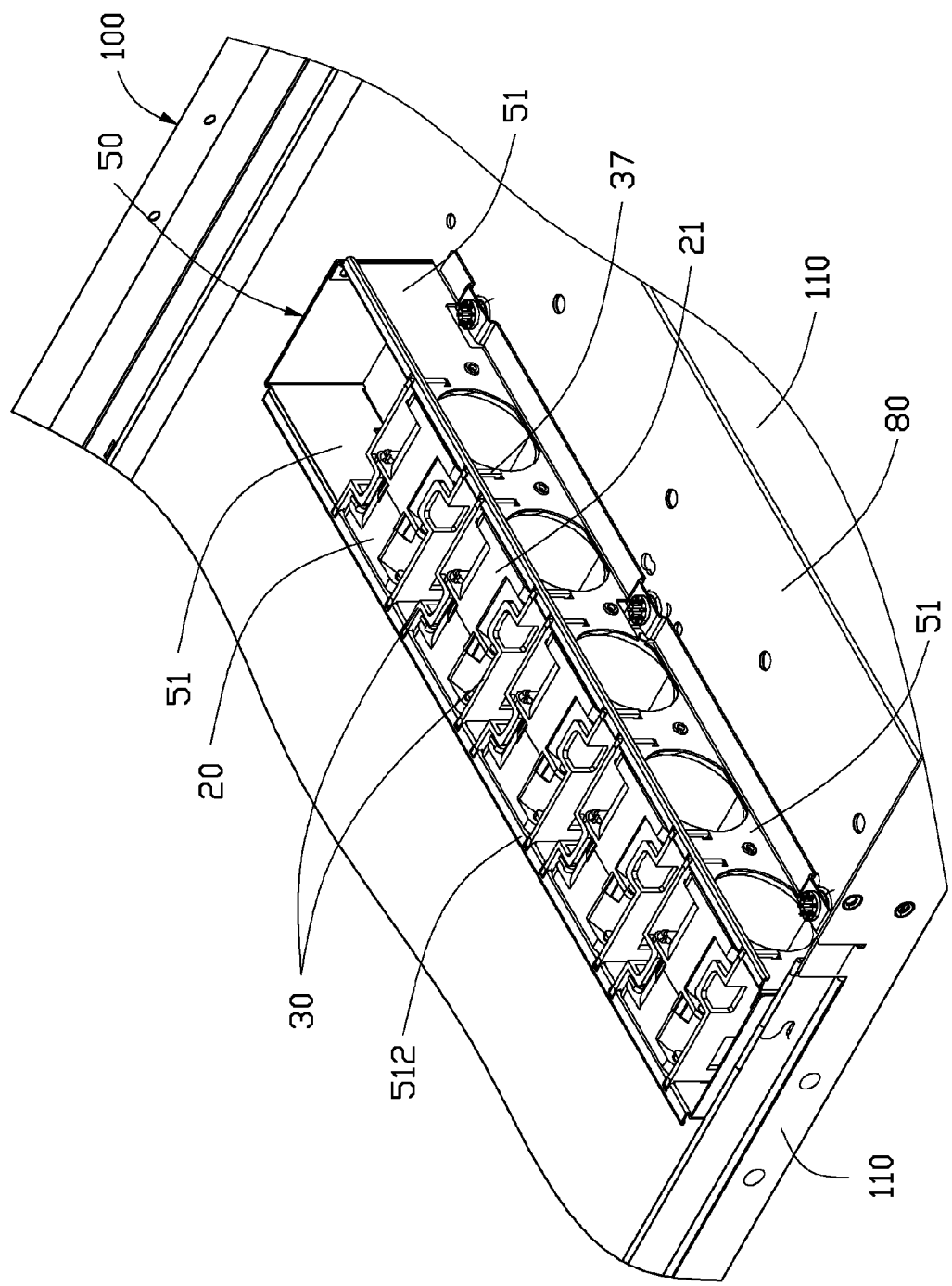
FIG. 4 is similar to FIG. 3, but shows a plurality of assembled heat dissipating members.

Referring also to FIG. 4, a plurality of heat dissipating members 20 is shown to be secured in the bracket 50 between securing plates 51.

Referring to FIG. 1, in one embodiment, the bracket 50 is secured to a circuit board 80. The first and second female connectors 531 and 533 are electrically coupled to the circuit board 80. The circuit board 80 is secured to the base plate 110 between the side plates 120.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A heat dissipating assembly comprising:
a heat dissipating member, and a male connector coupled to the heat dissipating member with a cable;
a bracket comprising two securing plates, and each securing plate defining a positioning hole; and
a locking member secured to the heat dissipating member and comprising a board body, two locking portions located on the board body and engaged in each positioning hole of the two securing plates, the locking member defining a through opening, and two first locking blocks and two second locking blocks located on the locking member;
wherein the cable is received in the through opening, and the male connector secured both between the two first locking blocks and between the two second locking blocks;
the male connector comprises a base board and an inserting portion located on the base board; the base board is positioned between the two first locking blocks and the two second locking blocks; and the inserting portion is positioned between the two second locking blocks, a blocking tab is located on each of the two second locking blocks; and the base board is blocked by the blocking tab and is positioned between each blocking tab and the board body.

2. The heat dissipating assembly of claim 1, wherein a flange is located on each securing plate; each flange defines a through hole; and the two locking portions are engaged in the positioning holes via the through holes.

3. The heat dissipating assembly of claim 2, wherein the two securing plates are substantially parallel to each other, and the two flanges are substantially perpendicular to the two securing plates.

4. The heat dissipating assembly of claim 1, wherein a mounting piece is secured between the two securing plates, and a female connector is located on the mounting piece and electrically coupled to the male connector.

5. The heat dissipating assembly of claim 4, further comprising a chassis, the chassis comprising a base plate, a circuit board secured to the base plate and electrically coupled to the female connector, and the bracket secured to the circuit board.

6. The heat dissipating assembly of claim 1, wherein the two locking portions are engaged in the positioning holes of the two securing plates from outside of the bracket.

7. A heat dissipating assembly comprising:
a heat dissipating member, the heat dissipating member comprising two fans secured to each other, two male connectors electrically coupled to the two fans;
a bracket comprising two securing plates, each securing plate defining a positioning hole, and two female connectors secured between the two securing plates; and
two locking members secured to two opposite sides of the heat dissipating member, each locking member comprising a board body, and a locking portion located on each board body;
wherein the two male connectors are secured to the board bodies, and the two locking portions members are engaged in the two positioning holes to electrically couple the two male connectors to the two female connectors; two first locking blocks and two second locking blocks are located on each board body, each male connector comprises a base board and an inserting portion located on the base board; each base board is positioned between the two first locking blocks and the two second locking blocks; and each inserting portion is positioned between the two second locking blocks, a blocking tab is located on each of the two second locking blocks; and each base board is blocked by the blocking tab and is positioned between the blocking tabs and the board body.

8. The heat dissipating assembly of claim 7, wherein each securing plate is positioned between the board body and each locking portion.

9. The heat dissipating assembly of claim 8, wherein a flange is located on each securing plate; each flange defines a through hole; and the two locking portions are engaged in the two positioning holes via the through holes.

10. The heat dissipating assembly of claim 9, wherein the two flanges are substantially perpendicular to the two securing plates.

11. The heat dissipating assembly of claim 7, wherein two mounting pieces are secured between the two securing plates, and the two female connectors are located on the two mounting pieces.

12. The heat dissipating assembly of claim 7, further comprising a chassis, the chassis comprising a base plate, a circuit board secured to the base plate for electrically coupled to the two female connectors, and the bracket secured to the circuit board.

13. The heat dissipating assembly of claim 7, wherein each fan defines a plurality of mounting holes, and a plurality of locking posts is located on each board body to engage in the plurality of mounting holes.

14. The heat dissipating assembly of claim 7, wherein the two locking portions are engaged in the two positioning holes from outside of the bracket.

* * * * *